(12) United States Patent
Benvenuto et al.

(10) Patent No.: US 8,807,629 B2
(45) Date of Patent: Aug. 19, 2014

(54) AIR DAM

(75) Inventors: Guido Benvenuto, LaSalle (CA); Geoff Brooks, Macomb, MI (US); Aaron Boyer, Washington, MI (US)

(73) Assignee: Flex-N-Gate Corporation, Urbana, IL (US)

( * ) Notice: Subject to any disclaimer, the term of this patent is extended or adjusted under 35 U.S.C. 154(b) by 0 days.

(21) Appl. No.: 13/528,776

(22) Filed: Jun. 20, 2012

(65) Prior Publication Data

US 2013/0341962 A1 Dec. 26, 2013

Related U.S. Application Data

(60) Provisional application No. 61/499,255, filed on Jun. 21, 2011.

(51) Int. Cl.
*B62D 35/02* (2006.01)
*B62D 35/00* (2006.01)
*B60R 19/18* (2006.01)

(52) U.S. Cl.
CPC ....... *B62D 35/005* (2013.01); *B60R 2019/1886* (2013.01)
USPC ...................... 296/180.2; 296/181.5; 293/120

(58) Field of Classification Search
CPC .............................................. B60R 2019/1886
USPC ..................... 296/180.1, 181.5; 293/120–122
See application file for complete search history.

(56) References Cited

U.S. PATENT DOCUMENTS

| | | | | |
|---|---|---|---|---|
| 4,976,489 A | * | 12/1990 | Lovelace | 296/180.1 |
| 2003/0116996 A1 | * | 6/2003 | Soja et al. | 296/180.5 |
| 2003/0234555 A1 | * | 12/2003 | Hojna | 296/180.1 |
| 2010/0327624 A1 | * | 12/2010 | Wetzels et al. | 296/180.1 |

* cited by examiner

*Primary Examiner* — Glenn Dayoan
*Assistant Examiner* — Melissa A Black
(74) *Attorney, Agent, or Firm* — Gigette M. Bejin

(57) ABSTRACT

An air dam is provided which includes an upper portion, an intermediate portion and a flexible lower portion. The upper portion is affixed to the underside of a vehicle. The intermediate portion is integral to the upper portion. The flexible lower portion is affixed to the upper portion. The intermediate portion of the air dam is operatively configured to structurally support the flexible intermediate portion.

4 Claims, 4 Drawing Sheets

AIR DAM

CROSS-REFERENCE TO RELATED APPLICATIONS

This patent application claims priority to U.S. Provisional Patent Application bearing Ser. No. 61/499,255. The contents of which are hereby incorporated by reference.

BACKGROUND

The present invention relates generally to devices for improving vehicle aerodynamics, and more specifically to air dams for motor vehicles.

Many conventional motor vehicles, such as the modern-day automobile, include an air dam that is engineered to improve the aerodynamic characteristics of the vehicle body. A traditional air dam, which is sometimes referred to as an "air deflector," is mounted on the underside of the front-end structure of the vehicle body, extending downward into proximity with the roadway. Current air dam design is such that the air dam is positioned approximately 15 degrees from the ground wherein the contact point between the front tire and the ground is the vertex. Air dams improve the handling and control of the motor vehicle, increase fuel economy, and also improve the routing of air flow for cooling/heat exchange in the vehicle powertrain and air conditioning systems by managing the flow of turbulent air under and around the vehicle chassis and affecting internal airflows.

As a vehicle moves forward at higher speeds, air flow underneath the vehicle is more likely to increase where a vehicle does not have an air dam. Air flow underneath a vehicle is not desirable because a vehicle may experience lift as well as air turbulence under the vehicle thereby reducing fuel efficiency and increasing aerodynamic drag.

Traditional air dams are generally fixedly suspended from underneath the front-end structure of the vehicle. Air dams therefore redirect the air flow to the sides of the vehicle so as to minimize turbulence caused by ierregular under carriage surfaces. Such traditional air dams may be damaged upon sporadic unintended impact with a curb, driveway incline, or other roadway obstruction. The damage to the air dam reduces the effectiveness of the air dam and further increases the associated repairs and/or replacement costs.

SUMMARY

An air dam is provided which includes an upper portion, an intermediate portion and a flexible lower portion. The upper portion is affixed to the underside of a vehicle. The intermediate portion is integral to the upper portion. The flexible lower portion is affixed to the upper portion. The intermediate portion of the air dam is operatively configured to structurally support the flexible intermediate portion.

BRIEF DESCRIPTION OF THE DRAWINGS

The present invention will now be described by way of example, with reference to the accompanying drawings.

DETAILED DESCRIPTION

The present disclosure provides an air dam 10 which reduces air drag under a moving vehicle while maintaining damageability performance. The air dam 10 of the present disclosure serves to reduce lift, increase front end stability, and allows for smoother underbody air flow.

Figure 1:
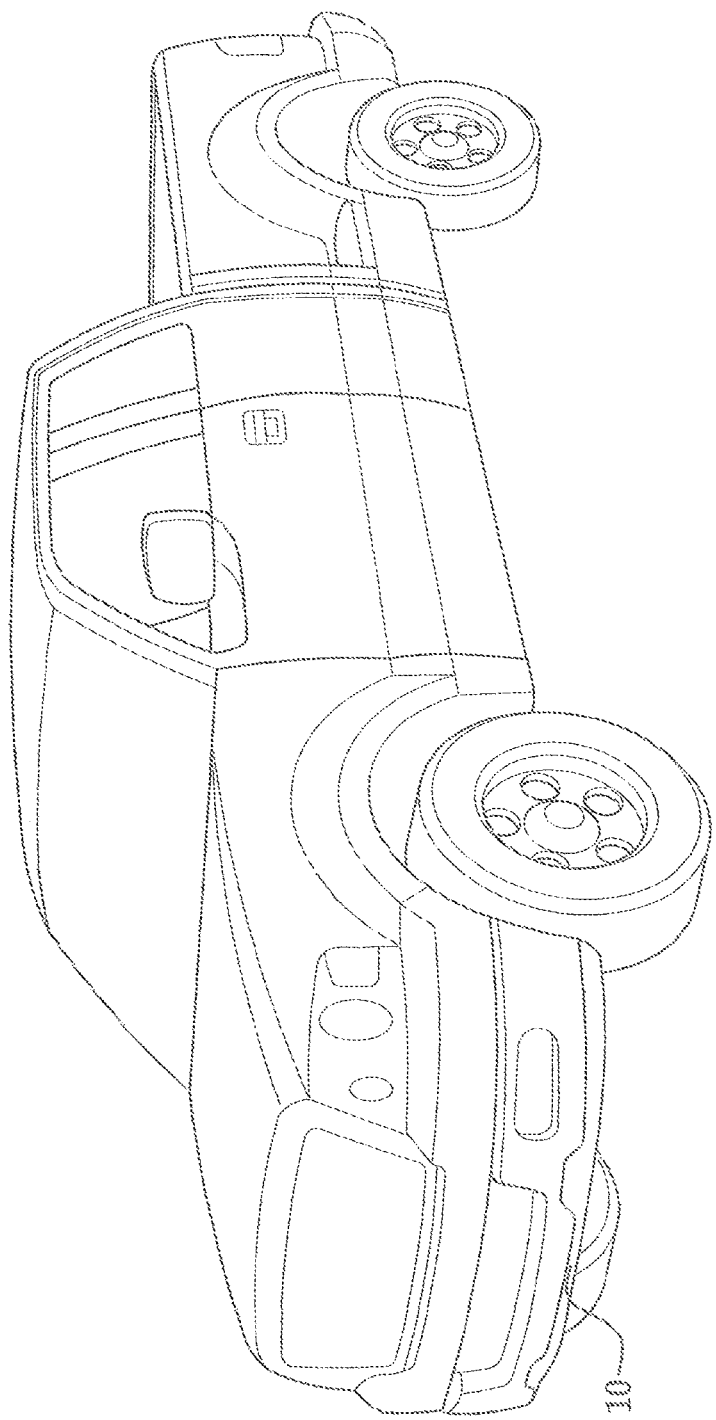
FIG. 1 illustrates an air dam of the present disclosure installed on a vehicle.

Referring now to the drawings, FIG. 1 illustrates a front view of an embodiment of the present disclosure. The air dam 10 shown in FIG. 1 is implemented on a vehicle such as an automobile, truck or SUV. The air dam 10 includes an upper portion 14, a lower portion 16 and an intermediate portion 28.

The upper portion 14 of the air dam 10 includes a substantially horizontal section 20 which lies below the bumper and may optionally further a section which integrally curves to a vertical wall 24. The lower portion 16 may be attached along to the bottom edge 32 of the upper portion 14. The lower portion 16 may be attached to the upper portion 14 via a dual shot mold.

The upper portion 14 may be formed from a rigid material such as, but not limited to a thermoplastic olefin material having a durometer value in the range of 90-120. The lower portion 16 may be formed from a flexible material having a durometer value in the range of 40-80.

Figure 2:
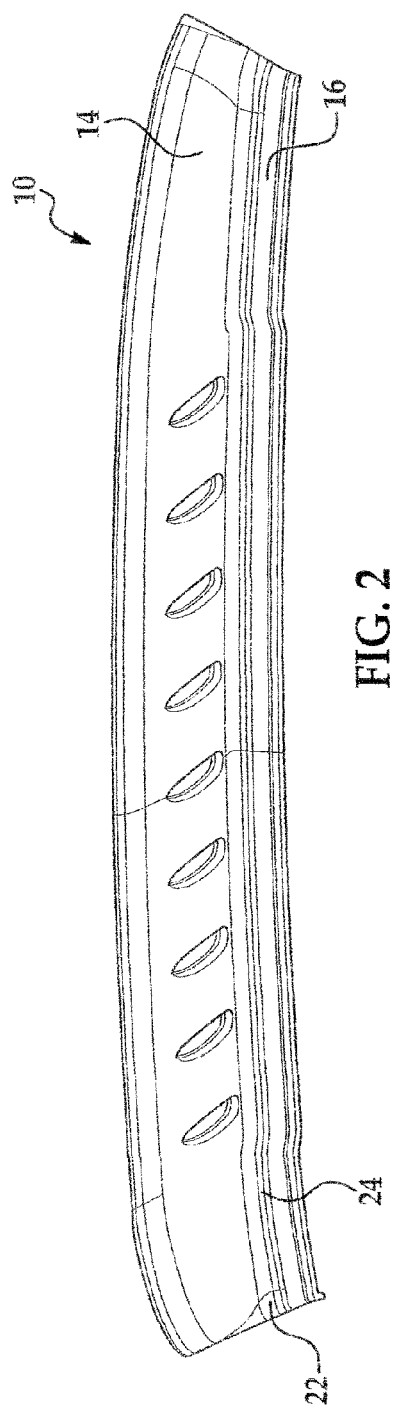
FIG. 2 illustrates the front side of an air dam of the present disclosure.
Figure 3:
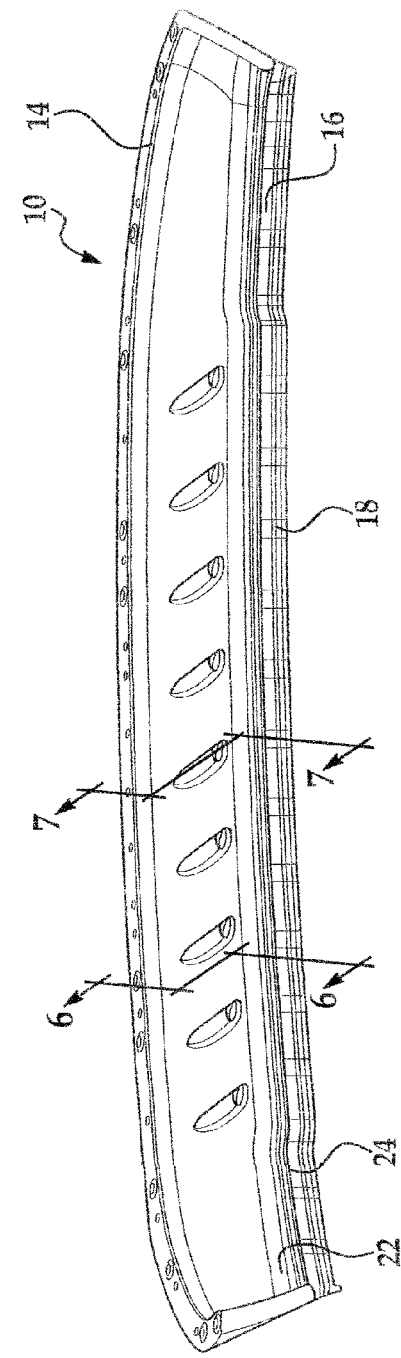
FIG. 3 illustrates the back side of an air dam of the present disclosure.
Figure 4:
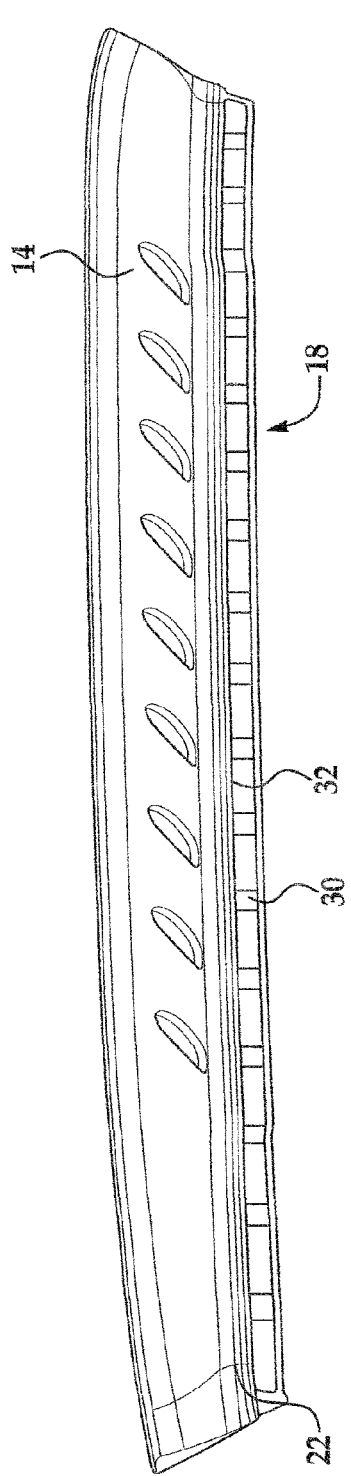
FIG. 4 illustrates a front view of the upper portion and the intermediate portion.

As shown in FIGS. 1 and 2, the intermediate portion 28 may be integral to the upper portion 14. As shown in FIGS. 3 and 4, the intermediate portion 28 includes a molded-in spine 18 that is integrally attached to the upper portion 14 through a plurality of flexible vertical sections 30. The molded-in spine 18 of the intermediate portion 28 is disposed along the lowest edge of the intermediate portion 28. It is to be understood that the molded in spine 18 may run along the entire bottom edge of the intermediate portion 28. Alternatively, the molded-in spine 18 may run along a portion or a substantial portion of the bottom edge of the intermediate portion 28.

Accordingly, the intermediate portion 28 may be integral to and formed from the same material as the upper portion 14, such as but not limited to a thermoplastic olefin. Accordingly, the upper portion 14, intermediate portion 28 and the lower portion 16 may be manufactured using a dual shot mold wherein the upper portion 14 and the intermediate portion 28 are integral to one another and are injected molded using the same material. The lower portion 16 may also be formed using a dual shot injection molding process wherein the lower portion 16 is made from a softer more flexible/resilient material.

As indicated, the molded-in spine 18 of the intermediate portion 28 is integral to the upper portion 14 via at least one flexible vertical section 30. As shown in FIGS. 3 and 4, the flexible vertical sections 30 are generally perpendicularly disposed between the upper portion 14 and the molded-in spine 18. The flexible vertical sections 30 and the molded-in spine 18 may be formed from the same material used in the upper portion 14. As shown in FIGS. 3 and 4, the upper portion 14 and the intermediate portion 18 (including the flexible vertical sections 30 and the molded in spine 18) may be injection molded as one piece.

The flexible vertical sections 30 are integrally formed at the bottom edge 22 of the upper portion 14. The flexible vertical sections 30 and molded-in spine 18 of the intermediate portion 28 provide some structure support for the lower portion 16 which is formed from a softer more flexible material. The lower portion 16, in conjunction with the intermediate portion 28, is therefore sufficiently rigid to deflect air to the lateral sides of the vehicle at high speeds, yet flexible enough to reduce damage when the air dam 10 of the present disclosure is sporadically impacted by rough terrain.

Figure 5:
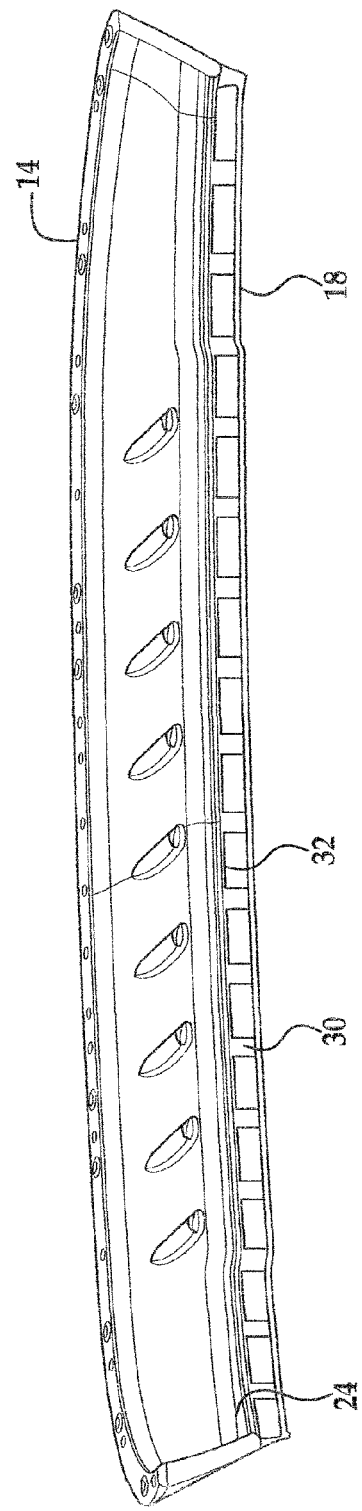
FIG. 5 illustrates a rear view of the upper portion and the intermediate portion.
Figure 6:
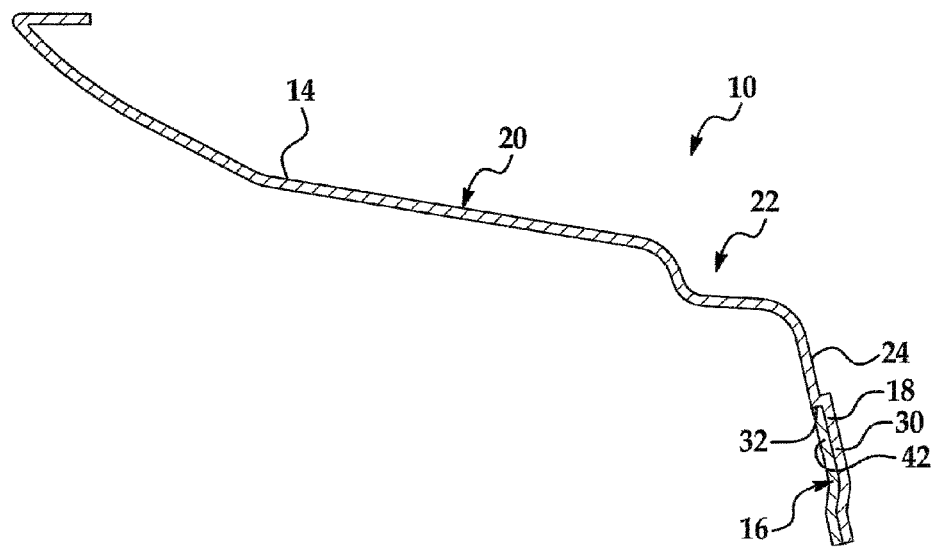
FIG. 6 illustrates a cross sectional view of the air dam in FIG. 3 along lines B-B.
Figure 7:
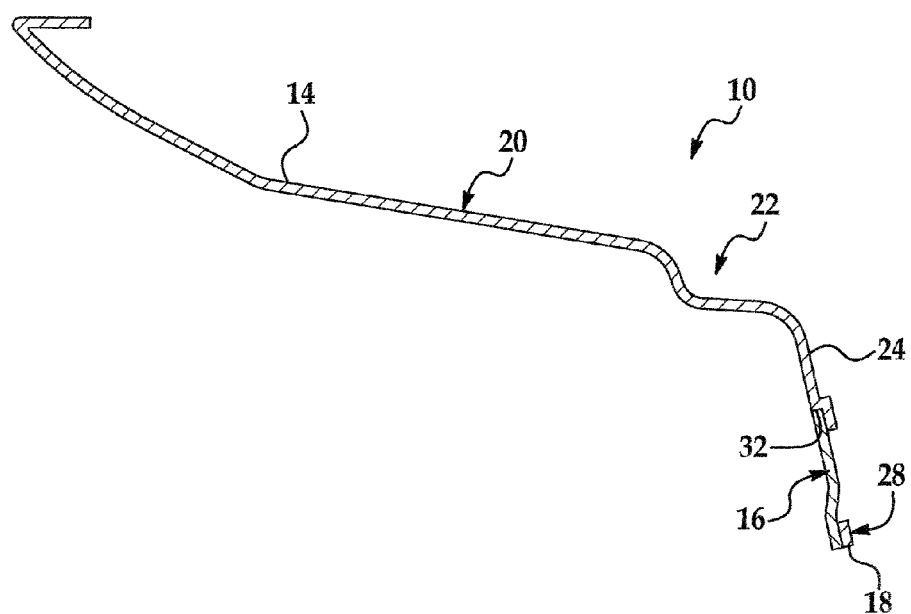
FIG. 7 illustrates a cross sectional view of the air dam in FIG. 3 along lines C-C.

Referring now to FIG. 5, a cross-sectional view along lines C-C is shown. A flexible vertical section 30 is integral to the upper portion 14 as it is injection molded using the same material of the upper portion 14. As shown, the flexible vertical section(s) 30, the bottom edge 22 of the upper portion 14 and the top edge of the molded-in spine 18 define a recess wherein the flexible lower portion 16 is disposed. As shown, the flexible lower portion 16 further serves to cover apertures 32 which are defined by the upper portion 14, spine 18 and flexible vertical sections 30.

It will be appreciated by those skilled in the art that, although the invention has been described with reference to one or more preferred embodiments, the invention is not limited to these disclosed embodiments and that various alternative embodiments or modifications to the disclosed embodiments could be made without departing from the scope of the invention.

What is claimed is:

1. An air dam comprising:
an upper portion affixed to the underside of a vehicle;
an intermediate portion integral to the upper portion having a plurality of vertical sections and a spine the plurality of vertical sections, the spine and the upper portion defining a plurality of apertures; and
a flexible lower portion supported by the upper portion and the intermediate portion, wherein the flexible lower portion is operatively configured to cover the plurality of apertures and deflect air away from the vehicle.

2. The air dam of claim 1 wherein the upper portion and intermediate portion are injected molded as one piece from the same material.

3. The air dam of claim 1 wherein the plurality of vertical sections are operatively configured to resiliently move with the flexible lower portion when the flexible lower portion is impacted.

4. The air dam of claim 3 wherein the plurality of vertical sections are operatively configured to maintain the flexible lower portion in a vertical position while air is deflected away from the flexible lower portion.

* * * * *